US012700333B2

(12) United States Patent
Kim et al.

(10) Patent No.: US 12,700,333 B2
(45) Date of Patent: Aug. 4, 2026

(54) DISPLAY APPARATUS HAVING BASE LAYER INSERTED INTO GROOVE DEFINED BY FIRST AND SECOND SHAFTS

(71) Applicant: Samsung Display Co., LTD., Yongin-si (KR)

(72) Inventors: Beomjin Kim, Yongin-si (KR); Jaeho Ahn, Yongin-si (KR); Cheol Jang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 247 days.

(21) Appl. No.: 18/395,254

(22) Filed: Dec. 22, 2023

(65) Prior Publication Data

US 2024/0321147 A1 Sep. 26, 2024

(30) Foreign Application Priority Data

Mar. 24, 2023 (KR) ........................ 10-2023-0039103
Jul. 25, 2023 (KR) ........................ 10-2023-0096991

(51) Int. Cl.
*G09F 1/00* (2006.01)
*G06F 1/16* (2006.01)
*G09F 9/30* (2006.01)

(52) U.S. Cl.
CPC .................................... *G09F 9/301* (2013.01)

(58) Field of Classification Search
CPC ..... G09F 9/301; F16M 11/105; G06F 1/1652; H10K 77/111; B66B 23/12; F16D 1/06; F16D 3/185; F16D 3/06; B62D 1/185; A63B 53/10; F16C 29/005; F16C 43/04; H01H 13/10; B63B 25/24; A45D 29/00
See application file for complete search history.

(56) References Cited

U.S. PATENT DOCUMENTS

| | | | | |
|---|---|---|---|---|
| 9,098,241 | B1 * | 8/2015 | Cho | G09F 9/301 |
| 9,710,020 | B2 * | 7/2017 | Choi | G06F 1/1652 |
| 9,940,892 | B2 | 4/2018 | Pang | |
| 9,992,881 | B2 * | 6/2018 | Choi | G09F 9/301 |

(Continued)

FOREIGN PATENT DOCUMENTS

| | | |
|---|---|---|
| KR | 1020150134262 A | 12/2015 |
| KR | 1020160088487 A | 7/2016 |

(Continued)

*Primary Examiner* — Rockshana D Chowdhury
(74) *Attorney, Agent, or Firm* — CANTOR COLBURN LLP

(57) ABSTRACT

A display including a first shaft extending in one direction and having a cross-section including a part of a circle on a plane perpendicular to the direction, a second shaft extending in the direction and combined with the first shaft such that a groove extending in the direction is defined therebetween, a base layer including a dummy area and a support area adjoining the dummy area with a portion of the dummy area inserted into the groove, and a display module on the support area, where outer surfaces of the first and second shafts form a continuous surface at a portion where the first shaft contacts the second shaft, and a length from the portion to an outer of a part of the second shaft defining the groove is less than a length from the portion to an outer of a part of the first shaft defining the groove.

36 Claims, 8 Drawing Sheets

(56) References Cited

U.S. PATENT DOCUMENTS

| | | | | |
|---|---|---|---|---|
| 10,264,687 | B2 | 4/2019 | Choi et al. | |
| 10,455,710 | B2 * | 10/2019 | Kim | G06F 1/1652 |
| 10,535,836 | B2 * | 1/2020 | Kim | H05K 5/0069 |
| 11,272,626 | B2 * | 3/2022 | Lee | G06F 1/1601 |
| 11,810,482 | B2 * | 11/2023 | Wu | G06F 1/1635 |
| 2013/0312920 | A1 * | 11/2013 | Mullet | E06B 9/72 160/310 |
| 2014/0362512 | A1 * | 12/2014 | Hinson | G06F 1/1601 361/679.21 |
| 2016/0139633 | A1 * | 5/2016 | Lee | G06F 1/1652 345/33 |
| 2016/0187929 | A1 * | 6/2016 | Kim | G06F 1/1643 345/184 |
| 2016/0209970 | A1 | 7/2016 | Lee | |
| 2016/0239050 | A1 * | 8/2016 | Kim | G06F 1/1652 |
| 2018/0014415 | A1 * | 1/2018 | Choi | H05K 5/0217 |
| 2020/0033913 | A1 * | 1/2020 | Yang | H04M 1/0268 |
| 2021/0029839 | A1 * | 1/2021 | Kwon | G09F 9/301 |
| 2022/0158331 | A1 * | 5/2022 | Jeon | H01Q 1/38 |
| 2022/0317732 | A1 * | 10/2022 | Lee | G06F 1/1643 |

FOREIGN PATENT DOCUMENTS

| | | | |
|---|---|---|---|
| KR | 1020180005774 | A | 1/2018 |
| KR | 102245808 | B1 | 4/2021 |

* cited by examiner

DISPLAY APPARATUS HAVING BASE LAYER INSERTED INTO GROOVE DEFINED BY FIRST AND SECOND SHAFTS

This application claims priority to Korean Patent Application No. 10-2023-0039103, filed on Mar. 24, 2023, and Korean Patent Application No. 10-2023-0096991, filed on Jul. 25, 2023, and all the benefits accruing therefrom under 35 U.S.C. § 119, the contents of which in their entireties are herein incorporated by reference.

BACKGROUND

1. Field

One or more embodiments relate to a display apparatus, and more particularly, to a rollable display apparatus with a reduced defect rate.

2. Description of the Related Art

Generally, display apparatuses may include a display module for displaying an image. These display apparatuses may be used in various fields, and display apparatuses with special characteristics may be desired according to the usage environment. For example, flexible characteristics may be desired for curved display apparatuses that can be bent to a preset curvature, foldable display apparatuses that can be folded or unfolded with respect to a certain folding axis, or rollable display apparatuses that can be rolled with respect to an imaginary rolling axis.

SUMMARY

A conventional flexible, foldable or rollable display apparatus may have a defect due to stress or the like generated when being bent, folded or rolled.

One or more embodiments include a rollable display apparatus with reduced defect rate.

According to an embodiment of the disclosure, a display apparatus includes: a first shaft extending in a first direction, and having a cross-section on a plane perpendicular to the first direction, where the cross-section of the first shaft includes a part of a circle having a radius; a second shaft extending in the first direction and combined with the first shaft in a way such that a groove extending in the first direction is defined between the first shaft and the second shaft, where an outer surface of a portion of the second shaft in contact with the first shaft defining a continuous surface with an outer surface of the first shaft, and a second length from an end of the outer surface of the portion of the second shaft in contact with the first shaft to an outer end of a portion of the second shaft defining the groove is less than a first length from an end of an outer surface of a portion of the first shaft in contact with the second shaft to an outer end of a portion of the first shaft defining the groove; a base layer including a dummy area and a support area connected to the dummy area, where a portion of the dummy area is inserted into the groove; and a display module disposed on the support area of the base layer.

In an embodiment, a difference between the first length and the second length may correspond to the thickness of the base layer.

In an embodiment, the difference between the first length and the second length may correspond to a value obtained by adding the thickness of the display module and the thickness of the base layer.

According to an embodiment of the disclosure, a display apparatus includes: a first shaft extending in a first direction, and having a cross-section on a plane perpendicular to the first direction, where an outer surface of the cross-section of the first shaft has a first radius of curvature; a second shaft extending in the first direction and combined with the first shaft in a way such that a groove extending in the first direction is defined between the first shaft and the second shaft, wherein an outer surface of a cross-section of the second shaft on a plane perpendicular to the first direction has a second radius of curvature less than the first radius of curvature, and an outer surface of a portion of the second shaft in contact with the first shaft forms a continuous surface with outer surface of the first shaft; a base layer comprising a dummy area, and a support area connected to the dummy area, where a portion of the dummy area is inserted into the groove; and a display module disposed on the support area of the base layer.

In an embodiment, the dummy area may include a first dummy area and a second dummy area located between the first dummy area and the support area.

In an embodiment, the first dummy area may be located in the groove.

In an embodiment, in a state where the second dummy area and the support area may be rolled on an outer surface of an assembly of the first shaft and the second shaft, a length from a first boundary between the second dummy area and the first dummy area to a second boundary between the second dummy area and the support area may correspond to a length of a portion of the base layer wrapping around the assembly at least one time.

In an embodiment, a portion of the base layer in the support area may include a basic layer and a plurality of supports arranged parallel to each other in the basic layer, and each extending in the first direction.

In an embodiment, a width in the first direction of the basic layer may be the same as the length in the first direction of each of the plurality of supports.

In an embodiment, opposing end surfaces of each of the plurality of supports may form continuous surfaces with side surfaces of the basic layer.

In an embodiment, the plurality of supports may be apart from each other.

In an embodiment, a portion of the base layer in the dummy area may include a dummy basic layer connected to the basic layer.

In an embodiment, the basic layer and the dummy basic layer may be integrally formed with each other as a single unitary and indivisible part.

In an embodiment, the basic layer and the dummy basic layer may each include silicon or polyurethane acrylate.

In an embodiment, the display apparatus may further include a rubber layer covering an outer surface of the assembly of the first shaft and the second shaft.

In an embodiment, a modulus of the base layer may be lower than a modulus of each of the first shaft and the second shaft.

In an embodiment, the display apparatus may further include fastening members which fastens the first shaft and the second shaft to each other.

In an embodiment, the base layer and the display module may each be flexible.

In an embodiment, the display apparatus may further include an adhesive layer between the base layer and the display module.

Other features than those described above will become apparent from the following drawings, claims, and detailed description of the disclosure.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
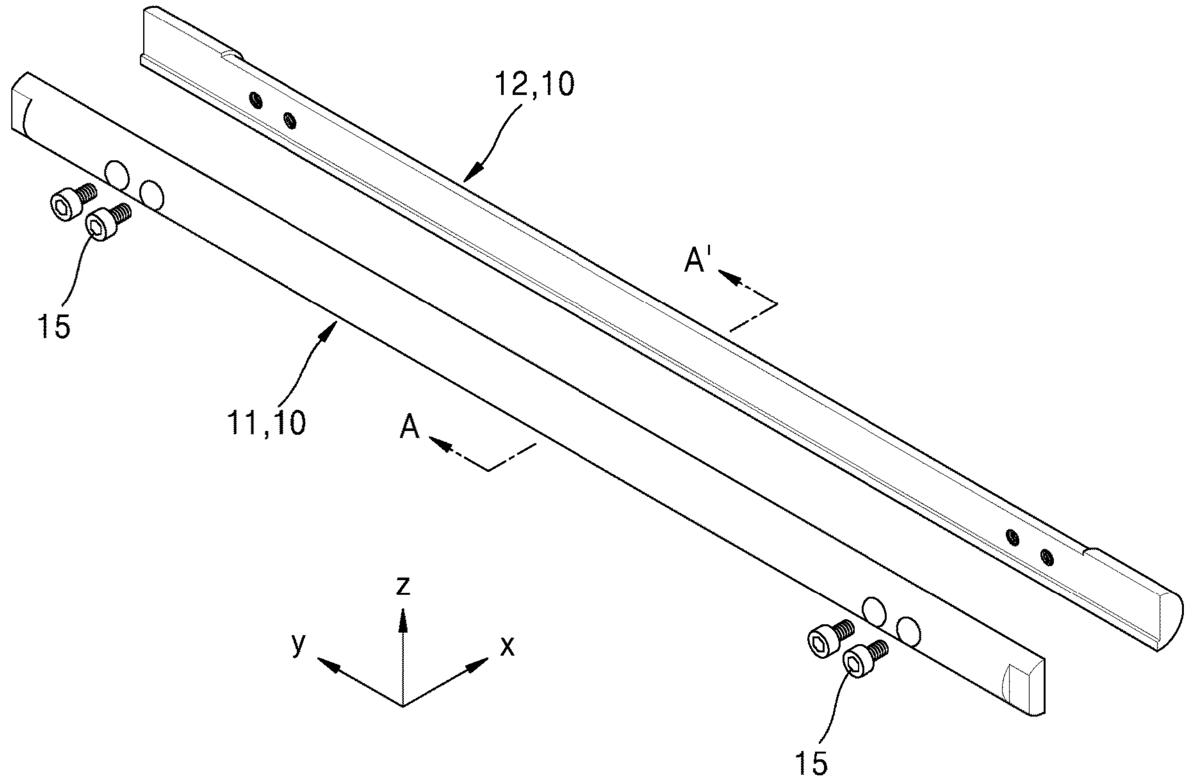
FIG. 1 is a schematic exploded perspective view of a shaft included in a display apparatus according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. " "

Various modifications may be applied to the embodiments described herein, and particular embodiments will be illustrated in the drawings and described in the detailed description section. The effect and features of the embodiments, and a method to achieve the same, will be clearer referring to the detailed descriptions below with the drawings. However, the embodiments may be implemented in various forms, not by being limited to the embodiments presented below.

Hereinafter, embodiments will be described in detail with reference to the accompanying drawings, and in the description with reference to the drawings, the same or corresponding constituents are indicated by the same reference numerals and any repetitive detailed descriptions thereof may be omitted or simplified.

In the following embodiment, it will be understood that when a component, such as a layer, a film, a region, or a plate, is referred to as being "on" another component, the component can be directly on the other component or intervening components may be present therebetween. Sizes of components in the drawings may be exaggerated for convenience of explanation. For example, since sizes and thicknesses of elements in the drawings are arbitrarily illustrated for convenience of explanation, the following embodiments are not limited thereto.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Throughout the disclosure, the expression "at least one of a, b or c" or "at least one selected from a, b and c" indicates only a, only b, only c, both a and b, both a and c, both b and c, all of a, b, and c, or variations thereof. Similarly, the expression such as "at least one of A and B" or "at least one selected from A and B" may include A, B, or A and B.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

In the following embodiment, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

In the following embodiment, it will be understood that when a layer, region, or component is referred to as being "connected to" another layer, region, or component, it can be directly connected to the other layer, region, or component or indirectly connected to the other layer, region, or component via intervening layers, regions, or components. For example, in the specification, when a layer, region, or component is referred to as being electrically connected to another layer, region, or component, it can be directly electrically connected to the other layer, region, or component or indirectly electrically connected to the other layer, region, or component via intervening layers, regions, or components.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a schematic exploded perspective view of a shaft included in a display apparatus according to an embodiment. As shown in FIG. 1, the display apparatus according to an embodiment may include an assembly 10, that is, a shaft, in which a first shaft 11 and a second shaft 12 are combined with each other. FIG. 1 illustrates the assembly 10 in a state in which the first shaft 11 and the second shaft 12 are disassembled from each other.

In an embodiment, the first shaft 11 may have a shape extending in a first direction (a y axis direction). In addition, the first shaft 11 may have a shape in which a cross-section thereof in a plane (a z-x plane) perpendicular to the first direction (the y axis direction) includes a part of a circle having a radius. This will be described below.

The second shaft 12 may also have a shape extending in the first direction (the y axis direction). The second shaft 12 may be combined with the first shaft 11. In a state where the first shaft 11 and the second shaft 12 are combined with each other, a groove 10*a* (see FIG. 2) may be defined or formed between the first shaft 11 and the second shaft 12. The groove 10*a* may have a shape extending in the first direction (the y axis direction).

The first shaft 11 and the second shaft 12 may be combined with each other by various manners. In an embodiment, for example, as illustrated in FIG. 1, fastening members 15 such as bolts penetrate through-holes defined or formed in the first shaft 11 and the second shaft 12 to combine the first shaft 11 with the second shaft 12. The first shaft 11 and the second shaft 12 may be combined with each other by various other methods. In an alternative embodiment, for example, a protruding portion may be defined or formed on the first shaft 11 in a direction toward the second shaft 12, a recess in which the protruding portion is to be inserted may be defined or formed in the second shaft 12, and thus, the first shaft 11 and the second shaft 12 may be combined with each other as the protruding portion of the first shaft 11 is inserted into the recess of the second shaft 12.

Figure 2:
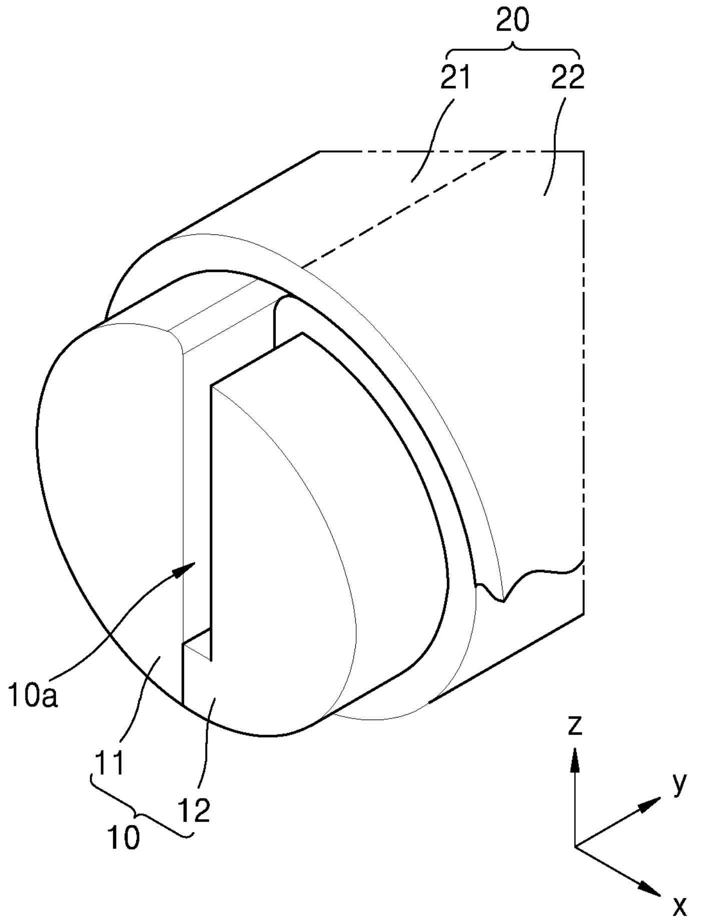
FIG. 2 is a schematic perspective view of a part of a display apparatus according to an embodiment.
Figure 3:
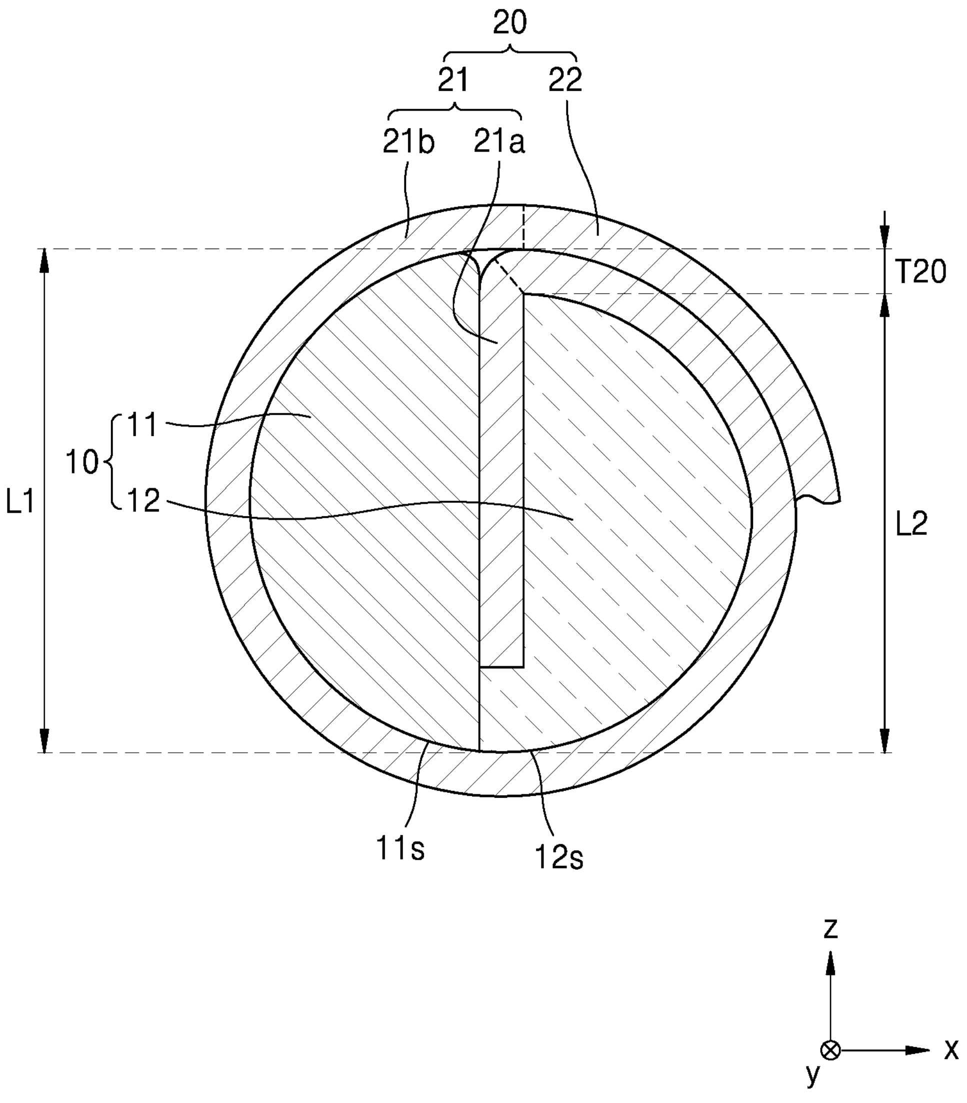
FIG. 3 is a schematic cross-sectional view of the display apparatus of FIG. 2.

FIG. 2 is a schematic perspective view of a part of the display apparatus according to an embodiment. FIG. 2 shows the assembly 10 in a state where the first shaft 11 and the second shaft 12 are combined with each other, and a base layer 20. FIG. 3 is a schematic cross-sectional view of the display apparatus of FIG. 2 taken along line A-A' of FIG. 1. For reference, in FIGS. 2 and 3, the base layer 20 is illustrated as being rolled on an outer surface of the assembly 10 of the first shaft 11 and the second shaft 12.

In an embodiment, as described above, the assembly 10, in a state where the first shaft 11 is combined with the second shaft 12, includes the groove 10*a* defined therein. In this state, an outer surface 11*s* of a portion of the first shaft 11 in contact with the second shaft 12 and an outer surface 12*s* of a portion of the second shaft 12 in contact with the first shaft 11 may form a continuous surface (e.g., a continuously curved surface or a single curved surface), as illustrated in FIGS. 2 and 3. In such an embodiment, a step may not be formed between the outer surface 11*s* of the portion of the first shaft 11 in contact with the second shaft 12 and the outer surface 12*s* of the portion of the second shaft 12 in contact with the first shaft 11.

In an embodiment, as illustrated in FIGS. 2 and 3, a part of the base layer 20 may be inserted into the groove 10*a* of the assembly 10 in which the first shaft 11 is combined with the second shaft 12. The base layer 20 may include a dummy area 21 and a support area 22 connected to the dummy area 21. A part of the dummy area 21 of the base layer 20 may be inserted into the groove 10*a* of the assembly 10 in which the first shaft 11 is combined with the second shaft 12. In an embodiment, the dummy area 21 may include a first dummy area 21*a* and a second dummy area 21*b* located between the first dummy area 21*a* and the support area 22, and the first dummy area 21*a* may be inserted into the groove 10*a* of the assembly 10 in which the first shaft 11 is combined with the second shaft 12. In such an embodiment, the first dummy area 21*a* may be located in the groove 10*a* of the assembly 10 defined between the first shaft 11 and the second shaft 12.

The second dummy area 21*b* may be located outside the groove 10*a* of the assembly 10 defined between the first shaft 11 and the second shaft 12, and may be rolled on the outer surface of the assembly 10 of the first shaft 11 and the second shaft 12. The support area 22 connected to the second dummy area 21*b* may be also rolled on the outer surface of the assembly 10 of the first shaft 11 and the second shaft 12. In this state, as illustrated in FIGS. 2 and 3, as the second dummy area 21*b* surrounds the assembly 10 of the first shaft 11 and the second shaft 12, at least one time, the support area 22 may not be in direct contact with the assembly 10 of the first shaft 11 and the second shaft 12. In such an embodiment, a length from a first boundary between the first dummy area 21*a* and the second dummy area 21*b* to a second boundary between the second dummy area 21*b* and the support area 22 may be equivalent to a length surrounding the assembly 10 of the first shaft 11 and the second shaft 12, at least one time.

The size of the first shaft 11 may be different from the size of the second shaft 12. In an embodiment, as illustrated in FIG. 3, where a length from an end of the outer surface 11*s* of a portion of the first shaft 11 in contact with the second shaft 12 to an outer end of a portion of the first shaft 11 forming the groove 10*a* is a first length L1, and that a length from an end of the outer surface 12*s* of a portion of the second shaft 12 in contact with the first shaft 11 to an outer end of a portion of the second shaft 12 forming the groove 10*a* is a second length L2, the second length L2 may be less than the first length L1. In an embodiment, as shown in FIGS. 2 and 3 where the groove 10*a* is recessed in a z axis direction, the first length L1 and the second length L2 may be a width in the z axis direction. A difference between the first length L1 and the second length L2 may correspond to a thickness T20 of the base layer 20.

In an embodiment, as described above, the first dummy area 21*a* may be located in the groove 10*a* of the assembly 10 in which the first shaft 11 is combined with the second shaft 12, and the second dummy area 21*b* may surround the assembly 10 of the first shaft 11 and the second shaft 12, at least one time. Accordingly, the second boundary between the second dummy area 21*b* and the support area 22 may be located at (or to overlap in the z axis direction) the first boundary between the first dummy area 21*a* and the second dummy area 21*b*, or over the second dummy area 21*b*.

In an embodiment where the second boundary between the second dummy area 21*b* and the support area 22 is located over the first boundary between the first dummy area 21*a* and the second dummy area 21*b*, it is desired to prevent a step from being formed in the base layer 20 in the vicinity of the second boundary between the second dummy area 21*b* and the support area 22. In an embodiment where the second boundary between the second dummy area 21*b* and the support area 22 is located over the second dummy area 21*b*, it is desired to prevent a step from being formed in the second dummy area 21*b* in the vicinity of the first boundary between the first dummy area 21*a* and the second dummy area 21*b*. That is, in such an embodiment, it is desired to prevent the formation of a step in the support area 22 that is rolled on the assembly 10 of the first shaft 11 and the second shaft 12.

In an embodiment, as described above, as the second length L2 is shorter than the first length L1 in the first shaft 11 and the second shaft 12, or the difference between the first length L1 and the second length L2 may correspond to the thickness T20 of the base layer 20. Accordingly, as illustrated in FIG. 3, the formation of a step in the support area 22 rolled on the assembly 10 of the first shaft 11 and the second shaft 12 may be effectively prevented.

Figure 4:
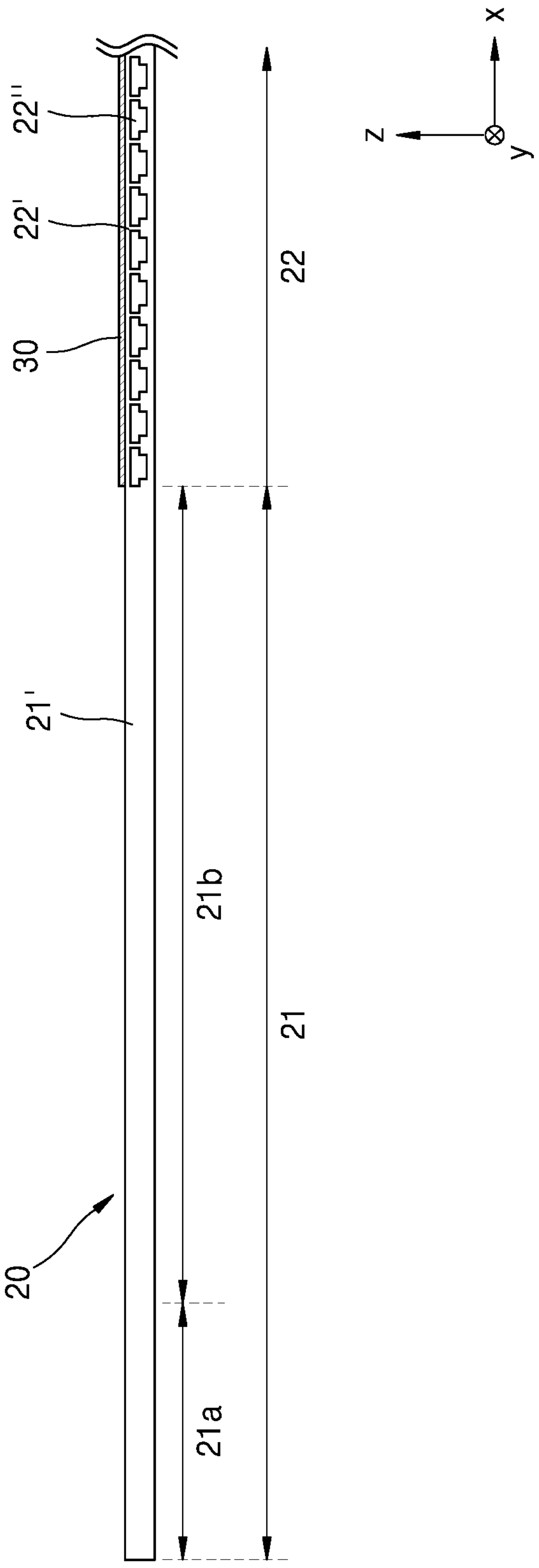
FIG. 4 is a schematic side view of part of a display apparatus according to an embodiment.

FIG. 4 is a schematic side view of a part of a display apparatus according to an embodiment. As illustrated in FIG. 4, a display module 30 may be disposed on the support area 22 of the base layer 20. In an embodiment, an adhesive layer may be provided between the support area 22 of the base layer 20 and the display module 30.

The display module 30 may include a display area and a peripheral area. A pixel circuit and a display element electrically connected thereto are arranged in the display area, and a scan drive circuit, a driving driver, and the like may be arranged in the peripheral area. In an embodiment, the display module 30 may include a touchscreen and the like. The display module 30 may be flexible like the base layer 20. The thickness of the display module 30 may be, for example, about 10% of the thickness of the base layer 20.

In such an embodiment, the display module 30 may be located on the support area 22 of the base layer 20. For reference, in FIGS. 2 and 3, for convenience of illustration, the display module 30 is omitted.

In such an embodiment, where the display module 30 is located on the support area 22 of the base layer 20, the difference between the first length L1 and the second length L2 in the first shaft 11 and the second shaft 12 may correspond (or equal) to a value obtained by adding the thickness of the display module 30 and the thickness T20 of the base layer 20. In such an embodiment, as illustrated in FIG. 3, when the base layer 20 is rolled on the assembly 10 of the first shaft 11 and the second shaft 12, a step corresponding to the thickness of the display module 30 may be formed at the second boundary between the second dummy area 21*b* and the support area 22. In such an embodiment, as the display module 30 is located on the support area 22 not to overlap the second dummy area 21*b* in a flat state, the display module 30 may offset the step formed at the second boundary between the second dummy area 21*b* and the support area 22. Accordingly, after the support area 22 on which the display module 30 is placed surrounds the assembly 10 of the first shaft 11 and the second shaft 12 once, no step is formed not only in the support area 22 but also as in the display module 30.

If a step is formed on the display module 30 as the base layer 20 on which the display module 30 is placed is rolled on the assembly 10 of the first shaft 11 and the second shaft 12, stress may be applied to a portion of the display module 30 where the step is formed, and thus, a display module 30 may be damaged. In the display apparatus according to an embodiment, in the first shaft 11 and the second shaft 12, the difference between the first length L1 and the second length L2 may correspond (or equal) to a value obtained by adding the thickness of the display module 30 to the thickness T20 of the base layer 20. Accordingly, when the base layer 20 on which the display module 30 is placed is rolled on the assembly 10 of the first shaft 11 and the second shaft 12, the formation of a step on the display module 30 is effectively prevented so that occurrence of a defect in a display apparatus may be effectively prevented.

In an embodiment, as described above, the thickness of the display module 30 may be, for example, about 10% of the thickness of the base layer 20. In such an embodiment, the base layer 20 may have a low modulus such that, in the first shaft 11 and the second shaft 12, the second length L2 is less than the first length L1, or the difference between the first length L1 and the second length L2 corresponds (or is equal) to the thickness T20 of the base layer 20. In such an embodiment, as the base layer 20 having a low modulus is elastic, a step due to a thin thickness of the display module 30 may not occur in the display module 30. The base layer 20 having a low modulus may be understood as, for example, the modulus of the base layer 20 is lower than the modulus of the first shaft 11 or the second shaft 12.

Figure 5:
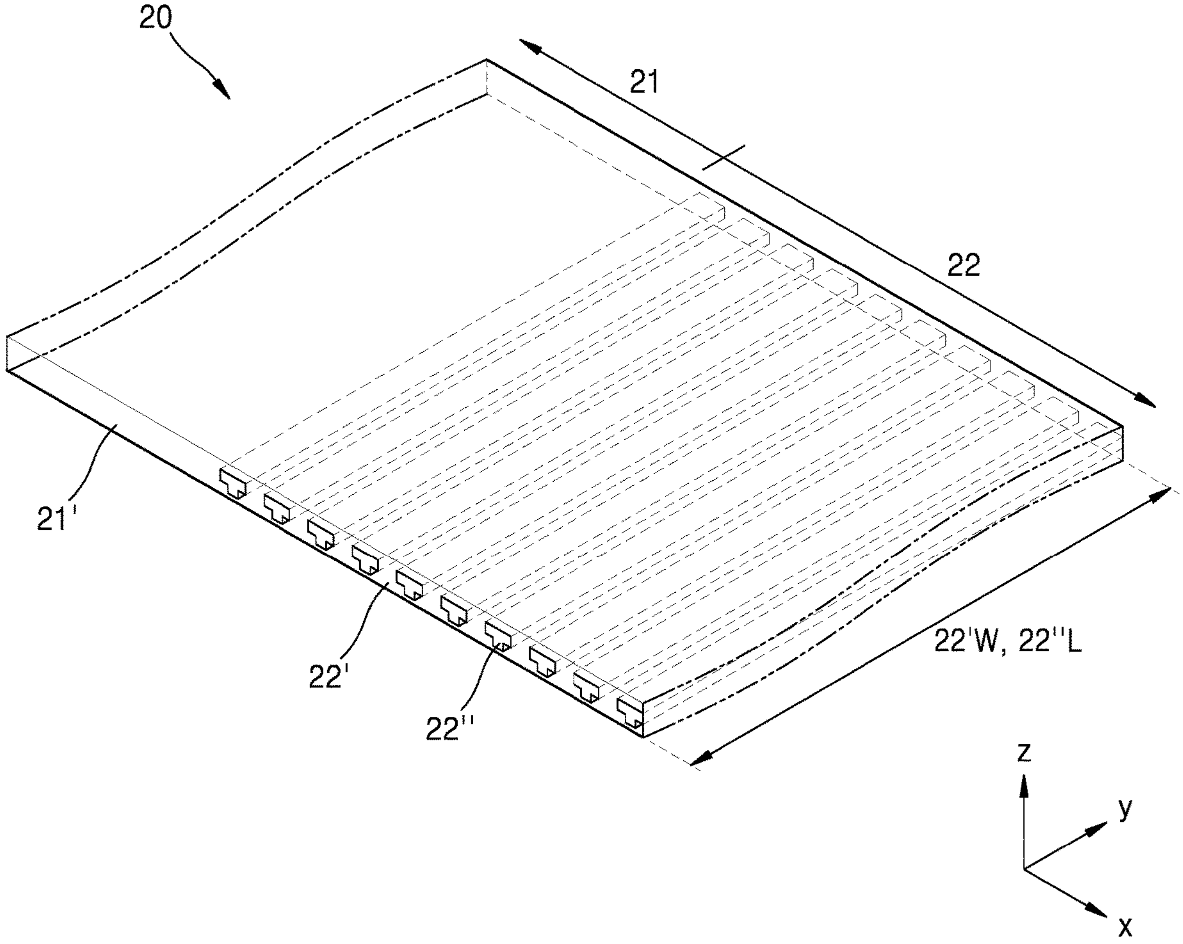
FIG. 5 is a schematic perspective view of a base layer included in a display apparatus according to an embodiment.

Hereinafter, the structure of the base layer 20 will be described in detail with reference to FIGS. 4 and 5. FIG. 4 is a schematic side view of the base layer 20 and the display module 30 that are parts of a display apparatus according to an embodiment, and FIG. 5 is a schematic perspective view of the base layer 20 included in a display apparatus according to an embodiment.

In an embodiment, the base layer 20 in the support area 22 may include a basic layer 22' and a plurality of supports 22". The supports 22" may be arranged in the basic layer 22' to be apart from each other and parallel to each other. Each of the supports 22" may extend in the first direction (the y axis direction). As illustrated in FIG. 5, a width 22'W in the first direction (the y axis direction) of the basic layer 22' may be the same as a length 22'"L in the first direction (the y axis direction) of each of the supports 22". Accordingly, opposing end surfaces of each of the supports 22", which are opposite to each other in the y axis direction, may form continuous surfaces with the side surfaces of the basic layer 22', which are opposite to each other in the y axis direction. The opposing end surfaces of each of the supports 22" forming continuous surfaces with the side surfaces of the basic layer 22' means that the opposing end surfaces of each of the supports 22" are not located inside the basic layer 22', but are exposed to the outside.

As the base layer 20 in the support area 22 includes the basic layer 22', the base layer 20 in the dummy area 21 may include a dummy basic layer 21'. The dummy basic layer 21' may be connected to the basic layer 22', and further, the basic layer 22' and the dummy basic layer 21' may be integrated or integrally formed with each other as a single unitary and indivisible part.

Herein, the base layer 20 having a low modulus may be understood such that, for example, the moduli of the basic layer 22' and the dummy basic layer 21' is lower than the modulus of the supports 22". In an embodiment, the basic layer 22' and the dummy basic layer 21' may each include silicon, or curable resin such as polyurethane acrylate, and the supports 22" may include carbon fiber reinforced plastic (CFRP). The supports 22" may prevent the display module 30 from being twisted in a process of rolling the display module 30 on the assembly 10 of the first shaft 11 and the second shaft 12.

Figure 6:
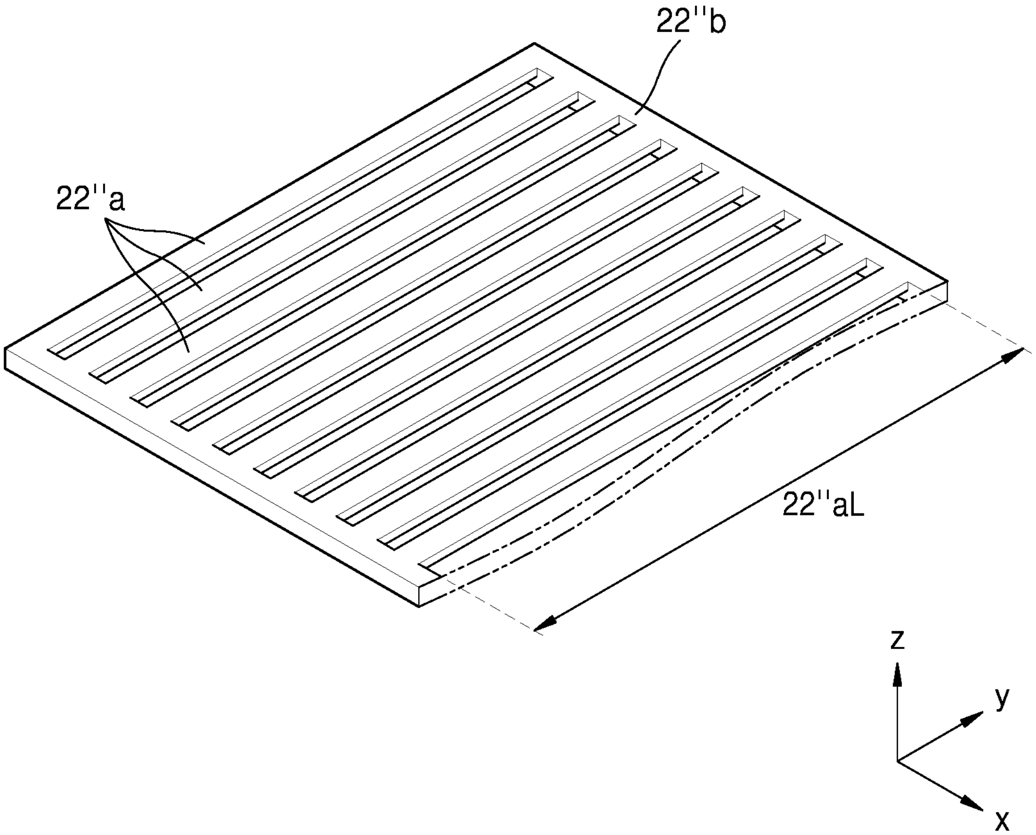
FIGS. 6 and 7 are schematic perspective views showing an embodiment of a method of manufacturing the base layer of FIG. 5.
Figure 7:
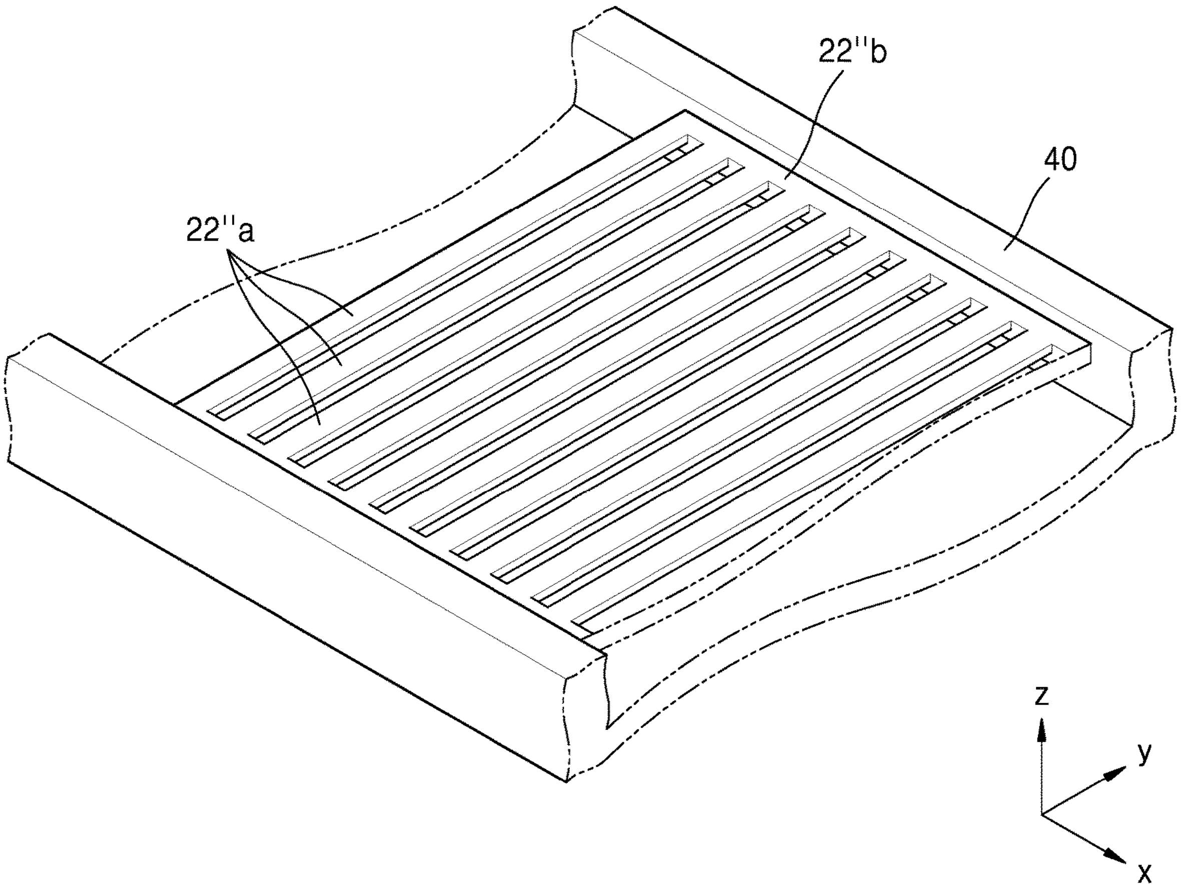

FIGS. 6 and 7 are schematic perspective views showing an embodiment of a method of manufacturing the base layer 20 of FIG. 5.

In an embodiment, as illustrated in FIG. 6, a frame for forming the supports 22" is prepared. The frame may include a plurality of pre-supports **22"*a* that will become the supports 22" later, and connection portions 22"*b* connected to opposing ends of the pre-supports 22"*a*. The pre-supports 22"*a* may each have a same cross-section as that of each of the supports 22". The pre-supports 22"*a* and the connection portions 22"*b* may be integrally formed as a single unitary and invisible part, and may include carbon fiber reinforced plastic. A length 22"*a*L in the first direction (the y axis direction) of the pre-supports 22"*a* as illustrated in FIG. 6 may be greater than or equal to the length 22'"L in the first direction (the y axis direction) of each of the supports 22" as illustrated in FIG. 5**.

In such an embodiment, the prepared frame is placed in a mold 40 as illustrated in FIG. 7. In this state, a lower surface of the frame in a-z direction may not be in contact with an inner lower surface of the mold 40. This may be achieved by various methods of, for example, providing a support between the connection portions **22"*b* of the frame and the inner lower surface of the mold 40, fixing the connection portions 22"*b* of the frame and an inner side surface of the mold 40 to each other, or the like. In addition, a space in which the frame is not located may be present in the mold 40. In FIG. 7, a portion in a-x direction of the inner space of the mold 40** is the space in which the frame is not located.

While the frame is placed in the mold 40 as described above, a material for forming the basic layer 22' and the dummy basic layer 21' is applied into the mold 40 and then cured. In an embodiment, for example, a material for forming polyurethane acrylate is located in the mold 40 so that the frame is covered by the material, and then, ultraviolet light and the like is radiated thereto to cure the material to be polyurethane acrylate. The space in which the frame is not located, which is a portion in the −x direction from the frame in the inner space of the mold 40, may be filled with polyurethane acrylate.

Then, the connection portions **22"*b* of the frame are removed. This may be achieved by cutting opposing end portions of each of the pre-supports 22"*a*. As such, when the connection portions 22"*b* of the frame are removed, resin or the like located at the corresponding portions are removed together. Accordingly, the base layer 20 as illustrated in FIG. 5** may be formed.

Figure 8:
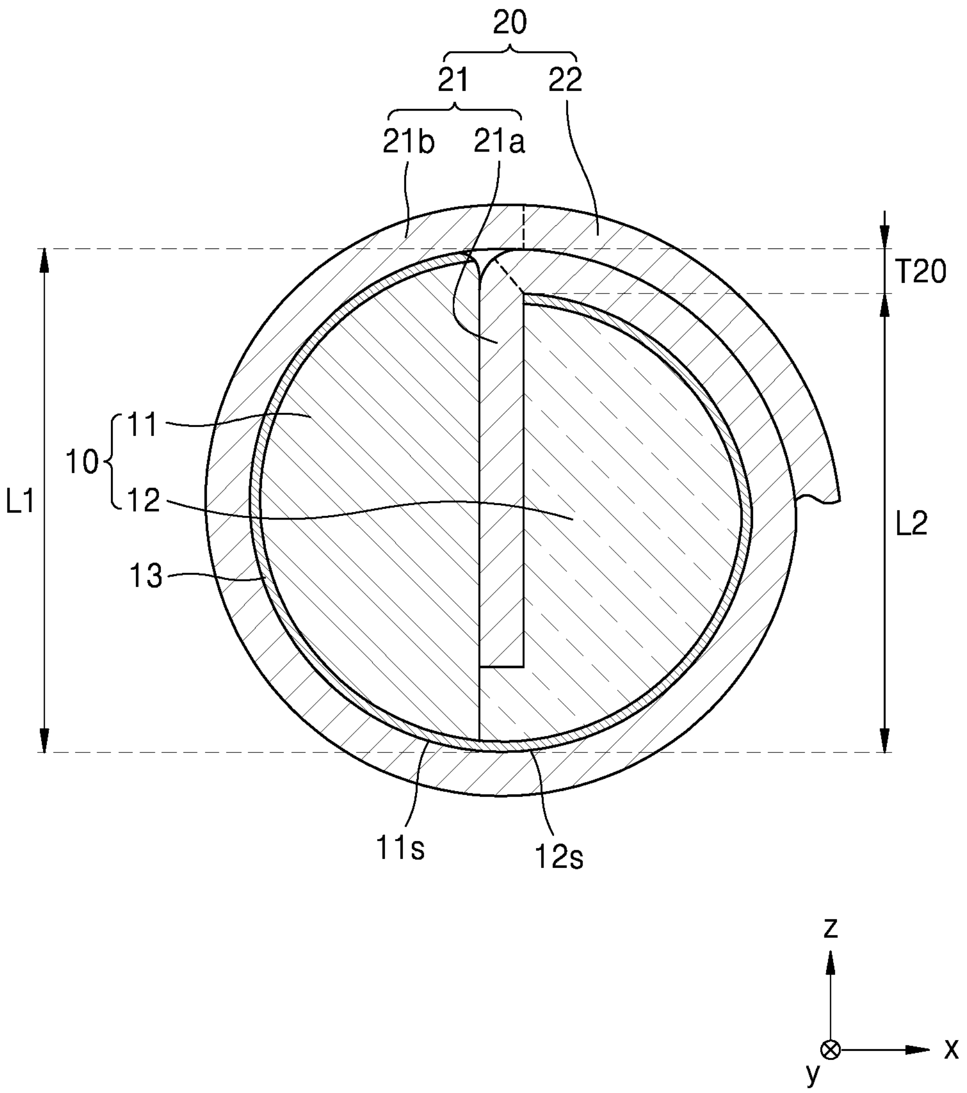
FIG. 8 is a schematic cross-sectional view of part of a display apparatus according to an embodiment.

In an embodiment, as described above, the base layer 20 may have a low modulus to be elastic. In an alternative embodiment, as illustrated in FIG. 8, which is a schematic cross-sectional view of a part of a display apparatus according to an embodiment, the display apparatus may further include a rubber layer 13 that covers the outer surface of the assembly 10 of the first shaft 11 and the second shaft 12, outside the groove **10*a*, that is, except for surfaces defining the groove 10*a*. Accordingly, the stress applied to the display module 30** in a rolled state may be reduced.

In such an embodiment, as described above, the second length L2 of the second shaft 12 is less than the first length L1 of the first shaft 11. However, the disclosure is not limited thereto.

In an embodiment, for example, in the first shaft 11, the outer surface of a cross-section of the first shaft 11 in the plane (the z-x plane) perpendicular to the first direction (the y axis direction) in which the first shaft 11 extends has a first radius of curvature, and in the second shaft 12, the outer surface of a cross-section of the second shaft 12 in the plane (the z-x plane) perpendicular to the first direction (the y axis direction) in which the second shaft 12 extends has a second radius of curvature. In such an embodiment, the second radius of curvature may be less than the first radius of curvature. In such an embodiment, the first shaft 11 and the second shaft 12, except for the features described above, may be substantially the same as those described above, and the base layer 20, the display module 30, or the like may be substantially the same as those described above. In such an embodiment, for example, the assembly 10 in which the first shaft 11 is combined with the second shaft 12 has the groove **10*a*. The outer surface 11*s* of a portion of the first shaft 11 in contact with the second shaft 12 and the outer surface 12*s* of a portion of the second shaft 12 in contact with the first shaft 11 may form a continuous surface, as illustrated in FIGS. 2 and 3. Accordingly, the outer end of a portion of the first shaft 11 forming the groove 10*a* and the outer end of a portion of the second shaft 12 forming the groove 10*a* may have a shape misaligned with each other, as illustrated in FIG. 3** and the like.

The display apparatus according to embodiments described above is a rollable display apparatus. For example, for the display apparatus according to an embodiment, in normal times, the base layer 20 on which the display module 30 is placed is rolled on the assembly 10 of the first shaft 11 and the second shaft 12, thereby maintaining an overall volume in a relatively small state. When desired, the base layer 20 on which the display module 30 is placed is released from the assembly 10 of the first shaft 11 and the second shaft 12, so that a user may view a large display area.

The display apparatus according to an embodiment may include a rollable display apparatus as described above. In such an embodiment, the display apparatus may be a television, a portable tablet, a wearable display device, or one installed in a vehicle or the like. In such an embodiment, the display apparatus may include bearings located at each of one end and the other end in the first direction (the y axis direction) of the assembly 10 of the first shaft 11 and the second shaft 12 illustrated in FIG. 1 or the like. Accordingly, in the display apparatus including a rollable display apparatus, the assembly 10 of the first shaft 11 and the second shaft 12 may be relatively easily rotated with respect to a housing in which the rollable display apparatus is disposed, or the like.

According to embodiments of the invention, as described above, a rollable display apparatus with reduced defect rate may be implemented.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:

a first shaft extending in a first direction and having a cross-section on a plane perpendicular to the first direction, wherein the cross-section of the first shaft includes a part of a circle having a radius;

a second shaft extending in the first direction and combined with the first shaft in a way such that a groove extending in the first direction is defined between the first shaft and the second shaft, wherein an outer surface of a portion of the second shaft in contact with the first shaft forms a continuous surface with an outer surface of the first shaft, and a second length from an end of the outer surface of the portion of the second shaft in contact with the first shaft to an outer end of a portion of the second shaft defining the groove is less than a first length from an end of an outer surface of a portion of the first shaft in contact with the second shaft to an outer end of a portion of the first shaft defining the groove;

a base layer comprising a dummy area and a support area connected to the dummy area, wherein a portion of the dummy area is inserted into the groove in a second direction orthogonal to the first direction; and a display module disposed on the support area of the base layer, wherein an interface between the first shaft and the second shaft extends in the second direction.

2. The display apparatus of claim 1, wherein a difference between the first length and the second length corresponds to a thickness of the base layer.

3. The display apparatus of claim 1, wherein a difference between the first length and the second length corresponds to a value obtained by adding a thickness of the display module and a thickness of the base layer.

4. The display apparatus of claim 1, wherein the dummy area comprises a first dummy area and a second dummy area located between the first dummy area and the support area.

5. The display apparatus of claim 4, wherein the first dummy area is located in the groove.

6. The display apparatus of claim 5, wherein in a state where the second dummy area and the support area are rolled on an outer surface of an assembly of the first shaft and the second shaft, a length from a first boundary between the second dummy area and the first dummy area to a second boundary between the second dummy area and the support area corresponds to a length of a portion of the base layer wrapping around the assembly at least one time.

7. The display apparatus of claim 1, wherein a portion of the base layer in the support area comprises: a basic layer; and a plurality of supports arranged parallel to each other in the basic layer and each extending in the first direction.

8. The display apparatus of claim 7, wherein a width in the first direction of the basic layer is the same as a length in the first direction of each of the plurality of supports.

9. The display apparatus of claim 8, wherein opposing end surfaces of each of the plurality of supports form continuous surfaces with side surfaces of the basic layer.

10. The display apparatus of claim 7, wherein the plurality of supports are apart from each other.

11. The display apparatus of claim 7, wherein a portion of the base layer in the dummy area comprises a dummy basic layer connected to the basic layer.

12. The display apparatus of claim 11, wherein the basic layer and the dummy basic layer are integrally formed with each other as a single unitary and indivisible part.

13. The display apparatus of claim 12, wherein the basic layer and the dummy basic layer comprise silicon or polyurethane acrylate.

14. The display apparatus of claim 1, further comprising:

a rubber layer covering an outer surface of an assembly of the first shaft and the second shaft.

15. The display apparatus of claim 1, wherein a modulus of the base layer is lower than a modulus of each of the first shaft and the second shaft.

16. The display apparatus of claim 1, further comprising:

fastening members which fastens the first shaft and the second shaft to each other.

17. The display apparatus of claim 1, wherein each of the base layer and the display module is flexible.

18. The display apparatus of claim 1, further comprising:

an adhesive layer between the base layer and the display module.

19. A display apparatus comprising:

a first shaft extending in a first direction and having a cross-section on a plane perpendicular to the first direction, wherein an outer surface of the cross-section of the first shaft has a first radius of curvature;

a second shaft extending in the first direction and combined with the first shaft in a way such that a groove extending in the first direction is defined between the first shaft and the second shaft, wherein an outer surface of a cross-section of the second shaft on the plane perpendicular to the first direction has a second radius of curvature less than the first radius of curvature, and an outer surface of a first portion of the second shaft in contact with the first shaft forms a continuous surface with an outer surface of the first shaft;

a base layer comprising a dummy area and a support area connected to the dummy area, wherein a portion of the dummy area is inserted into the groove; and a display module disposed on the support area of the base layer, wherein the first portion of the second shaft is a first end of the second shaft along a circumferential direction, wherein the second shaft has a second portion that is a second end of the second shaft opposite the first portion along the circumferential direction, and wherein a theoretical curve extending from the outer surface at the second portion and having the second radius of curvature abuts a flat surface of the first shaft.

20. The display apparatus of claim 19, wherein the dummy area comprises a first dummy area and a second dummy area located between the first dummy area and the support area.

21. The display apparatus of claim 20, wherein the first dummy area is located in the groove.

22. The display apparatus of claim 21, wherein in a state where the second dummy area and the support area are rolled on an outer surface of an assembly of the first shaft and the second shaft, a length from a first boundary between the second dummy area and the first dummy area to a second boundary between the second dummy area and the support area corresponds to a length of a portion of the base layer wrapping around the assembly at least one time.

23. The display apparatus of claim 19, wherein a portion of the base layer in the support area comprises: a basic layer;

and a plurality of supports arranged parallel to each other in the basic layer and each extending in the first direction.

24. The display apparatus of claim 23, wherein a width in the first direction of the basic layer is the same as a length in the first direction of each of the plurality of supports.

25. The display apparatus of claim 24, wherein opposing end surfaces of each of the plurality of supports form continuous surfaces with side surfaces of the basic layer.

26. The display apparatus of claim 23, wherein the plurality of supports are apart from each other.

27. The display apparatus of claim 23, wherein a portion of the base layer in the dummy area comprises a dummy basic layer connected to the basic layer.

28. The display apparatus of claim 27, wherein the basic layer and the dummy basic layer are integrally formed with each other as a single unitary and indivisible part.

29. The display apparatus of claim 28, wherein the basic layer and the dummy basic layer each comprise silicon or polyurethane acrylate.

30. The display apparatus of claim 19, further comprising: a rubber layer covering an outer surface of an assembly of the first shaft and the second shaft.

31. The display apparatus of claim 19, wherein a modulus of the base layer is lower than a modulus of each of the first shaft and the second shaft.

32. The display apparatus of claim 19, further comprising: fastening members which fastens the first shaft and the second shaft to each other.

33. The display apparatus of claim 19, wherein each of the base layer and the display module is flexible.

34. The display apparatus of claim 19, further comprising: an adhesive layer between the base layer and the display module.

35. The display apparatus of claim 1, wherein a third direction is defined opposite to the second direction, wherein the outer surface of the first shaft has a first end portion positioned at an end of the first shaft in the third direction, and the outer surface of the second shaft has a second end portion that is an end of the second shaft in the third direction, and wherein the base layer is in direct contact with the first end portion and the second end portion.

36. The display apparatus of claim 19, wherein the portion of the dummy area is inserted into the groove in a second direction orthogonal to the first direction, wherein a third direction is defined opposite to the second direction, wherein the outer surface of the first shaft has a first end portion positioned at an end of the first shaft in the third direction, and the outer surface of the second shaft has a second end portion that is an end of the second shaft in the third direction, and wherein the base layer is in direct contact with the first end portion and the second end portion.

* * * * *